Patented June 20, 1944

2,352,070

UNITED STATES PATENT OFFICE 2,352,070

POLYALKYLENE POLYAMINOMALONAMIDE RESINS

Louis H. Bock, Huntingdon Valley, and Alva L. Houk, Philadelphia, Pa., assignors to Röhm & Haas Company, Philadelphia, Pa., a corporation of Delaware No Drawing. Application April 9, 1941, Serial No. 387,679

12 Claims. (Cl. 260—72)

This invention relates to reaction products of polyalkylene polyaminomalonamides and formaldehyde.

It has been found that formaldehyde and polyalkylene polyaminoamides of malonic acid react to give useful condensation products and resins. These resins and condensates are based upon the polyalkylene polyaminomalonamides that are obtained by reacting a malonic ester, such as diethyl malonate, with a polyalkylene polyamine, such as diethylene triamine, triethylene tetramine, tetraethylene pentamine, N,N'-bis(aminopropyl)ethylene diamine, etc. The details of the preparation of polyalkylene polyaminomalonamides are given in our copending application Serial No. 387,681, filed on even date. These amides include diamides, monoamides, and amides in which two acid groups are joined by a single polyalkylene amine group. All of these amides have in common available hydrogen atoms on an active methylene group and on nitrogen atoms.

Formaldehyde may be used in the form of an aqueous solution, a solution in an organic solvent such as an alcohol, or a solid polymer, such as paraformaldehyde. At least one mol of formaldehyde per mol of amide is required. It is preferred that one to three mols of formaldehyde be used per mol of amide, yet larger ratios are sometimes desirable, particularly to increase the insolubility of the final resins. When a considerable excess of formaldehyde is used, some insoluble resin may result during the stage of condensation. This can be controlled, however, by the addition of a reactive amine. When amines are used, a considerable excess of formaldehyde may be used without causing premature gelation. Excess formaldehyde also promotes hardness in the resin finally obtained.

Amines which thus help to control the reaction are those having at least one hydrogen atom on the nitrogen. While these amines may alter the primary addition products or condensates, the final resins appear to be essentially the same whether or not an amine is used. Suitable amines are secondary amines such as dimethylamine, diethylamine, dioctylamine, caprylmethylamine, dicyclohexylamine, cyclohexylmethylamine, etc., and primary amines such as methylamine, ethylamine, allylamine, cyclohexylamine, etc. The secondary amines of relatively low molecular weight are preferred.

In place of the reactive amine, there may be used a condensation product of a primary or secondary amine with formaldehyde. As is known, formaldehyde and a reactive amine can be condensed to give products such as bis-(diethylamino)methane. These compounds may be used to supply up to half of the total formaldhyde requirements.

The formaldehyde and polyalkylene polyaminoamides of malonic acid, with or without the modifying reactive amine or amine-formaldehyde condensate, combine upon being mixed. At the start of the reaction it is sometimes helpful to cool the reaction mixture even to 0° C., since heat is evolved. After the initial reaction it is generally desirable to hold the mixture between room temperature and about 100° C. to complete the condensation. The primary reaction may be performed with one or both reactants in solution. For this purpose it is most convenient to use water solutions but, if desired, an organic solvent such as ethyl alcohol or dioxane may be used for the reaction medium. The reaction may be performed under pressure, if desired.

The primary reaction products are soluble in water or alcohol, dioxane, and similar solvents. If the reaction is performed in a solvent, the solvent may be evaporated to concentrate or isolate the condensate. When the condensates are heated above 120° C., they are converted to insoluble resins. Thus, when surfaces have been coated with condensates or fibers, yarns, or fabrics have been impregnated with them, the condensates are rendered insoluble by heating. The baked films or deposits are resistant to water and alkaline solutions and are not removed by ordinary solvents. For these reasons the finish of fabrics impregnated with these resins is not changed by laundering or dry cleaning.

The following examples are illustrative of the preparation of condensates and the resins from the polyalkylene polyaminomalonamides and formaldehyde.

Example 1

To 54 parts of N,N'-bis-aminoethylaminoethylaminoethyl malonamide (obtained from a malonic ester and two mols of triethylene tetramine) there were added 80 parts of water and 30 parts of a 30% aqueous solution of formaldehyde. The mixture was stirred and the temperature raised to 70° C., at which point it was maintained for two hours. The solution was concentrated by removal of water under vacuum. A light brown gel was obtained, which was soluble in water. Films formed from a solution of the condensate were baked at 125° C. for thirty minutes to yield a hard, insoluble resin.

Example 2

There were stirred together 27.4 parts of N,N'-bis-aminoethylaminoethyl malonamide, 60 parts of a 35% aqueous solution of dimethylamine, and 30 parts of an aqueous solution containing 30% formaldehyde. The reaction mixture was warmed and stirred for three hours at 70–80° C. The condensate was concentrated by removing the water under vacuum. The product was a light orange-colored gel, which was soluble in water or alcohol.

Example 3

Sixty parts of N,N'-bis-aminoethylaminoethyl malonamide and 33 parts of a 30% aqueous solution of formaldehyde were mixed and stirred for two hours. 55 parts of water were added and the reaction mixture dissolved. The solution was then concentrated at low pressure.

A 20% solution of the reaction product was spread on a glass plate and dried. When the plate was baked at 130° C. for about 40 minutes, a clear, brittle film was formed which was insoluble in water, acids and organic solvents.

Example 4

(a) To 20.8 parts of N,N'-bis(aminopropyl-aminoethylaminopropyl) malonamide were added 20 parts of a 25% aqueous solution of dimethylamine and 10 parts of a 30% aqueous solution of formaldehyde. The mixture was stirred and heated at 65–75° C. for two hours. By warming at reduced pressure the reaction product was obtained as a thick syrup which was soluble in water.

(b) The above preparation was repeated with replacement, however, of the dimethylamine solution with 20 parts of water. A water-soluble product was likewise obtained.

With it there was prepared a 10% solution in water, which was used for impregnating silk yarn and nylon yarn by soaking these materials for 15 minutes with the solution at 50° C. The impregnated yarns were dried and baked for 20 minutes in an oven at 130° C. The yarns were then dyed in a bath of Pontacyl Carmine 6B. Deep red shades were obtained on both yarns. The untreated yarns were less susceptible to this dye.

Example 5

A reaction product was prepared from one mol of N,N'-bis(aminoethylaminoethyl) malonamide, 3 mols of formaldehyde, and 3.5 mols of dimethylamine by heating the mixture of these reactants on a steam bath for three hours. The solution was then neutralized with hydrochloric acid and diluted with water to yield a 20% solution.

Spun rayon fiber was placed in the solution, which was boiled for five minutes. The fibers were squeezed, dried, and heated for 30 minutes in an oven at 125° C. They were stiffer and more resilient than formerly and of a light tan shade. The color was removed by washing in soap solution. The fibers were then dyed in a simmering bath of Pontacyl Carmine 6B containing 0.5% of acetic acid. A deep purple color resulted, which was fairly light fast and fast to washing with soap and soda ash.

Example 6

A mixture of one mol of N,N'-bis(aminoethyl-aminoethylaminoethyl) malonamide and 1.5 mols of aqueous formaldehyde were heated together under pressure at 100–110° C. The product was adjusted to a pH of 6.8 with acetic acid and diluted to a 10% solution. Viscose yarn was soaked in this solution at 25° C. for one-half hour, dried and heated at 125° C. for 45 minutes. The yarn was then washed with hot soap and water and dyed with Amaranth W. A fast, rose color was obtained.

In another method of obtaining the resinous condensates of this invention, a reaction product of a secondary amine, such as dimethylamine, formaldehyde, and a malonic ester is first formed. This product still possesses a reactive methylene group and has, apparently, a structure

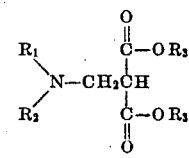

($R_1$, $R_2$ and $R_3$ being hydrocarbon groups). It reacts with a polyamine to give polyaminoamides, which combine with formaldehyde to give condensates and resins of the same type as described above.

The resins of this invention are useful for purifying gases and removing acidic constituents from water and other liquids.

We claim:

1. As new compositions of matter, the reaction products of formaldehyde and a N-polyalkylene polyaminoamide of malonic acid, said amide having a reactive methylene group.

2. As a new composition of matter, the reaction product of formaldehyde and an N-polyalkylene polyaminomalonamide.

3. As a new composition of matter, a condensate of formaldehyde, an aliphatic amine having at least one hydrogen atom on the nitrogen, and an N-polyalkylene polyaminomalonamide.

4. As a new composition of matter, a condensate of formaldehyde and a bis-(N-polyalkylene polyamino)amide of malonic acid, said amide having a reactive methylene group.

5. As a new composition of matter, a resin obtained by the reaction of formaldehyde and an N-polyalkylene polyaminodiamide of malonic acid.

6. As a new composition of matter, a reaction product of formaldehyde and N,N'-bis(aminoethylaminoethyl)malonamide.

7. The process of forming condensates of polyalkylene polyaminomalonamides which comprises mixing formaldehyde and an N-polyalkylene polyaminomalonamide.

8. The process of forming condensates of polyalkylene polyaminomalonamides which comprises mixing formaldehyde and an N-polyalkylene polyaminomalonamide in the presence of a solvent.

9. The process of forming condensates of polyalkylene polyaminomalonamides which comprises mixing formaldehyde, an aliphatic amine having a hydrogen atom on the nitrogen atom, and an N-polyalkylene polyaminomalonamide in the presence of a solvent.

10. The process of forming condensates of polyalkylene polyaminomalonamides which comprises mixing formaldehyde, a secondary aliphatic amine, and an N-polyalkylene polyaminomalonamide in the presence of a solvent.

11. The process of forming condensates of polyalkylene polyaminomalonamides which comprises mixing between one and three mols of formaldehyde and one mol of an N-polyalkylene polyaminomalondiamide in the presence of a solvent, and heating the mixture between room temperature and 100° C.

12. The process of forming condensates of polyalkylene polyaminomalonamides which comprises mixing between one and three mols of formaldehyde and one mol of N,N'-bis(aminoethylaminoethyl) malonamide in aqueous solution, and maintaining the mixture between room temperature and about 100° C. to complete the reaction.

LOUIS H. BOCK.
ALVA L. HOUK.